United States Patent Office 3,129,603
Patented Apr. 21, 1964

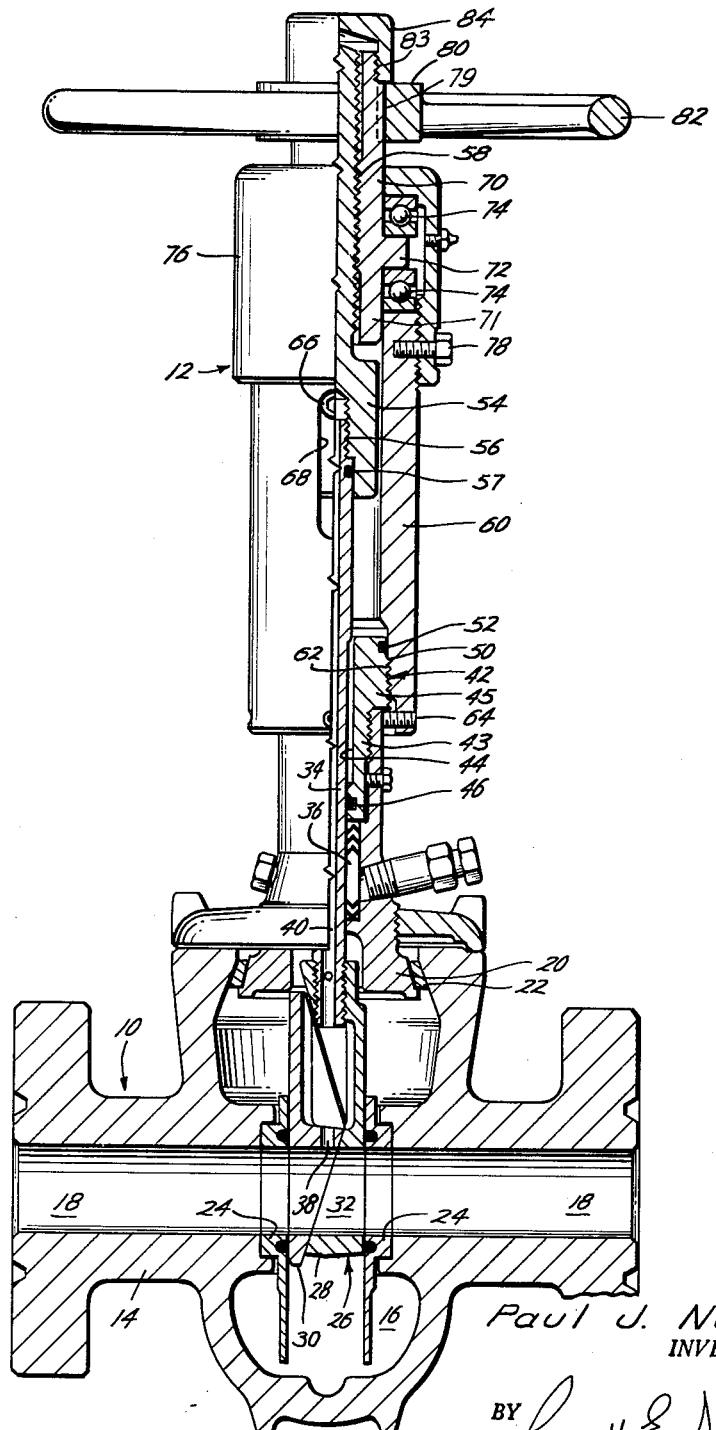

3,129,603
TEMPORARY HANDWHEEL OPERATOR
Paul J. Natho, Houston, Tex., assignor to ACF Industries Incorporated, New York, N.Y., a corporation of New Jersey
Filed May 1, 1961, Ser. No. 106,639
8 Claims. (Cl. 74—424.8)

This invention relates to a temporary handwheel operator for gate valves.

The most commonly used type of valve for high pressure petroleum wellhead application is the through conduit non-risng stem gate valve. One of the oldest and most popular of such through conduit gate valves is the double expanding wedge gate valve disclosed in Laurent U.S. Patent Re. 20,101. These valves are used as master valves in the run of Christmas trees which are the control valves for the well. They are also used as wing valves in the branch of the tree which are the regulatory valves. It is becoming more and more common to provide the upper master valve with a high-low pilot control valve which functions as an automatic piston operator to close the gate valve either upon a decrease or increase of pressure beyond certain predetermined limits within the flow line. One of the more common of the high-low pilot control valves is that disclosed in Otis U.S. Patent 2,566,772. The control valves are commonly made by companies other than the companies which manufacture and sell the gate valves.

While high-low pilot control valves do an admirable job of controlling the well after it has been cleaned up and is free of first run sand and other deleterious material; they are not reliable and tend to clog if they are put into the system prior to the well being cleaned. Therefore, it is customary that the Christmas tree be originally set with gate valves as they are supplied by the gate valve manufacturer. Then after the well has had an opportunity to clean itself out, service personnel from the pilot control valve organization come to the well site and make a field installation of the high-low pilot control valve on selected wellhead gate valves.

The pilot control valves are usually attached to a stem extending from the gate valve and a certain amount of adaptation is necessary, usually including converting a non-rising stem valve to a rising stem valve. As a rule the bonnet of the gate valve must be removed. While some gate valves used in this application have bolted bonnets, others are provided with a pressure sealing type bonnet such as the assembly disclosed in Laurent U.S. Patent 2,582,996. In valves having a bolted bonnet, one common method of field installation of pilot control valves is to remove the original bonnet and gate and stem assembly. A new gate with an especially adapted stem is installed and the original bonnet is replaced with a specially adapted bonnet provided by the pilot control valve manufacturer. However, this means that since the bonnet connection of the gate valve has been opened that upon completion of the installation of the control valve the gate valve has to be tested to see that there is no leak around the bonnet seal. It is most desirable that full test pressure be used to make this test. However, equipment to make such tests is oftentimes not available. Moreover, some of the major producing companies do not permit service personnel other than those of the gate valve manufacturer to disassemble wellhead valves. This is particularly so if the bonnet connection is other than bolted. In such case, personnel from both organizations must be present to install the control valves and accordingly the costs are increased.

Accordingly, it is the object of the present invention to provide a gate valve with a temporary handwheel operator which can be removed after the well has been cleaned up and the high and low pilot control valve easily installed without requiring the removal of the bonnet itself.

It is another object of the present invention to provide a wellhead valve which permits the installation of the high-low pilot control valve without requiring the removal of the bonnet assembly of the valve.

It is a further object to provide a wellhead valve which is adapted for easy installation of a high-low control valve.

In order to accomplish these objects, a wellhead gate valve having a reciprocating valve member is provided with a rising type stem and a temporary handwheel operator is attached to the valve. To attach the temporary handwheel operator to the gate valve, there is an adapter engaged with the bonnet of the gate valve. The adapter is provided with means which will receive the temporary handwheel assembly and later the high-low pilot control valve. An auxiliary stem is attached to the valve stem. The axially outer end of the auxiliary stem is provided with external threads. A collar is attached to the adapter with its inner end overlying the end of the bonnet. Means are provided to lock the collar in a non-rotative position. The collar surrounds the protruding end of the valve stem and the axially inner end of the auxiliary stem. Means are provided which make the auxiliary stem non-rotative whereby any movement of the auxiliary stem is reciprocatory. A rotatable bushing having internal threads is threadedly engaged with the threads of the auxiliary stem. In order to make the valve easy to operate, bearings may be positioned about a shoulder extending around the outer periphery of the rotatable bushing. A cap having a central passage permitting the extension of the bushing is attached to the axial outer end of the collar. A handwheel is attached to the extension of the bushing. In order to install the high-low control valve the collar and auxiliary stem are disengaged from their attachment with the adapter and stem which permits the handwheel operator to be removed and the high-low control valve may be attached to the adapter and stem in an expedient manner without removing the bonnet from the gate valve.

A preferred embodiment of the invention has been chosen for purpose of illustration and description and is shown in the accompanying drawing, forming a part of the specification, wherein:

The figure is a vertical elevation of a valve with the temporary handwheel of the present invention attached, half of it being in section.

Referring now to the drawings, the gate valve 10 to which the temporary handwheel operator 12 is attached is comprised of a body 14 which has an open-ended internal valve chamber 16 interposed between and communicating with aligned flow passages 18—18. The open end of the valve chamber 16 is closed by a bonnet 20. To provide a seal between the opening in the body and the bonnet, a pressure sealing ring 22 such as is shown in Laurent U.S. Patent 2,582,996 may be utilized. If desired, the bonnet 20 may be bolted to the top of the body 14 and a suitable sealing ring provided between the top of the body 14 and the bonnet 20 as is well known in the art.

Surrounding the valve chamber end of the aligned flow passage 18 are annular pockets in which are located valve seat members 24—24. Located in the valve chamber 16 between the seat members 24—24 is a reciprocating valve member 26. While the valve member 26, shown in the drawing, is formed of two sections, a gate 28 and segment 30, it is generally rectangular and has parallel seating faces which oppose the seat members 24—24. The abutting faces of the gate 28 and segment 30 are angularly disposed with respect to line of movement of the valve member 26. To form surfaces which provide a wedging action when the gate and segment are moved longitudinally relative to each other for the purpose of expanding the valve member 26 to bring the parallel seating faces into sealing engagement with the seats 24—24, the abutting faces of the gate 28 and segment 30 are angularly disposed with respect to the line of movement of the valve member 26. In order to make this wedging action positive in both directions of movement of the gate 28 relative to the segment 30, the abutting angular faces diverge in both directions from a middle point. This arrangement forms a double wedge which is positive acting in either direction of movement of the gate 28 relative to the segment 30. The gate and segment are assembled together as a unit to form the valve member 26 and movable as a unit except when given a relative movement to expand them against the seat member. The valve member 26 is provided with a passage 32 which aligns with the flow passages 18—18 in the open position. In the above respects, the valve member 26 is similar to the valve member fully disclosed in Laurent U.S. Reissue Patent Re. 20,101.

In order to move the valve member 26, a stem 34 is attached to one end of the valve member 26. As shown in the drawing, the axial inner end of the stem 34 is provided with threads which engage with mating threads located in the gate 28. To prevent the disengagement of the threaded connection, a pin extends through the neck in the gate 28. If desired, a T-head connection may be used as is well known in the art. Making the connection between the gate and stem non-rotative makes the valve a rising stem valve. Normally, in wellhead application gate valves are of the non-rising stem type. That is, the connection between the valve member and stem is such that as the handwheel operating the valve is turned the stem rotates and moves in and out of engagement with the valve member causing the valve member to reciprocate. However, with a piston type operator for automatic operation, the rising stem type of construction is used. In such construction, the stem is made non-rotative in relation to the valve member and reciprocates the same as the valve member. The stem 34 extends through an opening in the bonnet 20 and continues on past the top of the bonnet 20. To prevent any leakage between the opening in the bonnet and the stem, a packing box 36 is provided. To further adapt the valve for automatic piston operation, the segment 30 and the stem 34 are provided with passages 38 and 40, the purpose of which will be explained hereinafter.

In order to make a valve easy operating, the top of the body is usually provided with a bearing construction to take the thrust. In the valve of the present invention, this bearing construction is removed from its normal location in the top of the bonnet and positioned in the temporary handwheel operator 12 as will be explained subsequently. The adapter 42 has an axially inner portion 43 which fits within the opening in the bonnet, a part of this portion 43 is provided with threads mating with threads in the bonnet 20 securing the adapter 42 to the bonnet and an axially outer portion 45 of a greater diameter which receives and secures the temporary handwheel operator 12. A passage 44 extends through the adapter 42 permitting the extension of the stem 34. An O-ring 46 is positioned in the passage 44 to establish a seal between the stem 34 and passage 44. The inner end of the adapter 42 contacts and forms the outer end of the packing box 36. The shoulder between the two portions 43—45 contacts the outer end of the bonnet 20. In order to receive and secure the temporary handwheel operation 12 and later a high-low pressure control valve of the type shown in Otis U.S. Patent 2,566,772, the axial outer portion 45 of the adapter 42 is provided with male threads 50. To establish a seal for the high-low pilot control valve to be later installed, the axially outer end of the adapter is provided with a groove in which is positioned an O-ring 52.

Attached to the end of the stem 34 is an auxiliary stem 54. As is shown in the drawing, the auxiliary stem has its axially inner end provided with a female thread 56 which engages with the male thread on the axial outer end of the stem 34. Other means may be utilized to secure the auxiliary stem 54 to the stem 34 if desired. The axial outer end of the auxiliary stem 54 is provided with external threads 58. Since body pressure will flow into passage 40 in the stem 34 and will be present at the connection with the auxiliary stem 54, the stem is provided with a groove in which is positioned an O-ring 57 which will prevent escape of body fluid. It is also used later in sealing the piston of the high-low pilot control valve.

Surrounding the axial outer end of the stem 34 and the axially inner end of the stem 54 is a collar 60 having a threaded portion 62 adjacent the axial inner end which is threadedly engaged with the threads 50 of the adapter 42.

In order to non-rotatively secure the collar 60 to the valve, the inner end of the collar 60 overlies the end of the bonnet 20 and this portion is provided with a plurality of threaded apertures in which are engaged threaded members 64 which engage the external wall of the bonnet and hold the collar non-rotative in relation to the bonnet. As previously mentioned, the valve with a temporary handwheel operator attached is a rising stem valve. Accordingly, the stems do not rotate. As previously mentioned, the stem connection between the stem 34 and valve member 26 is such as to make it non-rotative. It is also necessary to make the auxiliary stem 54 non-rotative. One means of doing this is shown in the drawing where it can be seen that the inner end of the auxiliary stem 54 is provided with a threaded aperture into which a cap screw 66 is engaged. The collar 60 is provided with an axially extending slot 68 in which the cap screw 66 rides in a reciprocating manner. Since the slot 68 holds the cap screw 66 non-rotative, any motion of the auxiliary stem 54 and the stem 34 is reciprocatory tending to open and close the valve member.

A rotatable bushing 70 having internal threads 71 mates with the threads 58 on the axial outer end of the auxiliary stem 54. The bushing 70 has a shoulder 72 around its outer periphery. Positioned on each side of the shoulder 72 are thrust bearings 74—74. A cap 76 having a central aperture permitting the assembly of the bushing is threadedly engaged with the axial outer end of the collar 60. To make certain that the cap does not become disengaged from the collar 60, the collar may be provided with a threaded aperture mating with an aperture in the cap 76 and a threaded member 78 engaged in a threaded aperture in the collar locking the cap in position. The two bearings provide thrust members for the temporary handwheel operator 12. The portion of the bushing which extends past the top of the cap 76 is provided with flats 79 onto which the hub portion 80 of the handwheel 82 may be engaged. To secure the handwheel in position, the axially outer end of the bushing 70 is provided with threads 83 to receive a cap nut 84. Rotation of the handwheel 82 rotates the bushing 70 which being in threaded engagement with the threads 58 of the auxiliary stem 54 causes the auxiliary stem 54 and the valve member 26 which is attached through the stem 34, to reciprocate thereby positioning the valve in the open or closed position.

To install a high-low pressure control valve to the valve provided with the temporary handwheel operator 12, all that is necessary is to remove the threaded members 64 and then rotate the temporary handwheel operator from engagement with the bonnet 20. Simultaneously, the auxiliary stem 54 is disengaged from stem 34. It is advisable then to check to see that the openings 38 and 40 through the segment 30 and stem 34 are clear. These openings permit fluid pressure in the body of the valve 10 to flow into the high-low pressure control valve to be installed and provides the pressure which operates the valves and is sensed by the pilots. Accordingly, the stem and valve member do not have to be changed. The high-low pressure control valve can then be installed on the valve without any further alteration. It is not necessary in order to attach the high-low control valve to disturb in any way the bonnet connection; therefore, it is not necessary to make a pressure retest of the valve itself.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

What I claim is:

1. A temporary handwheel operator for a rising stem gate valve having a reciprocating valve member to which is attached a reciprocating valve stem extending through a passage in a bonnet attached to the valve body, said operator comprising:
    (1) an adapter having a passage through which a reciprocating valve stem extends, a threaded axially intermediate portion adapted to be threadedly engaged with the bonnet and an axially outer portion provided with external threads;
    (2) an auxiliary stem having a female threaded portion adjacent its axial inner end attached to the valve stem and an axially outer end provided with external threads;
    (3) a collar having a threaded portion adjacent the axially inner end attached to the external threads of the adapter, the collar having an axially inner end overlying the end of the bonnet, the remainder of the collar surrounding the protruding end of the valve stem and the axially inner end of the auxiliary stem,
        (a) the axially inner end of the collar having a plurality of threaded apertures in which are engaged threaded members,
        (b) said collar provided with an axially extending slot in which is positioned a member threadedly attached to the inner end of the auxiliary stem thereby making the auxiliary stem non-rotative whereby movement of said auxiliary stem is reciprocatory;
    (4) a bearing positioned on the axial outer end of the collar;
    (5) a rotatable bushing having internal threads which are threadedly engaged with the threads of the auxiliary stem, and having a shoulder around its outer periphery which is positioned on top of the bearing, said bushing having a reduced axially outer end portion which is provided with threads and the adjacent portion provided with flats adapted to receive the hub portion of a handwheel;
    (6) a second bearing positioned on the axially outer surface of the shoulder of the bushing;
    (7) a cap having a central passage to permit the assembly of the bushing and threadedly engaged with the axial outer end of the collar;
    (8) a handwheel having a hub portion adapted to mate with the flats adjacent the axially outer end of the bushing positioned on said flats;
    (9) a threaded member threadedly engaged with the threads on the axially outer end of the bushing.

2. A temporary handwheel operator for a rising stem gate valve having a reciprocating valve member to which is attached a reciprocating valve stem extending through a passage in a bonnet attached to the valve body, said operator comprising:
    (1) and adapter having a passage through which a reciprocating valve stem extends, an axially inner portion adapted to be secured to the bonnet and an axially outer portion provided with means to receive the temporary handwheel operator;
    (2) an auxiliary stem having an axially inner end attached to the valve stem and an axially outer end provided with external threads;
    (3) a collar having an axially inner end attached to the axially outer portion of the adapter, the collar having an axially inner end overlying the end of the bonnet, the remainder of the collar surrounding the protruding end of the valve stem and the axially inner end of the auxiliary stem,
        (a) the axially inner end of the collar provided with means securing it in a positive manner to the bonnet,
        (b) said collar provided with an axially extending slot in which is positioned a member attached to the inner end of auxiliary stem thereby making the auxiliary stem non-rotative whereby movement of said auxiliary stem is reciprocatory;
    (4) a bearing positioned on the axial outer end of the collar;
    (5) a rotatable bushing having internal threads which are threadedly engaged with the threads of the auxiliary stem, and having a shoulder around its outer periphery which is positioned on top of the bearing, said bushing having a reduced axially outer end portion provided with flats adapted to receive the hub portion of a handwheel;
    (6) a second bearing positioned on the axially outer surface of the shoulder of the bushing;
    (7) a cap having a central passage to permit the assembly of the bushing and secured to the axial outer end of the collar;
    (8) a handwheel having a hub portion adapted to mate with the flats on the axially outer end of the bushing positioned on said flats;
    (9) means securing the handwheel to the bushing.

3. A temporary handwheel operator for a rising stem gate valve having a reciprocating valve member to which is attached a reciprocating valve stem extending through a passage in a bonnet attached to the valve body, said operator comprising:
    (1) an adapter having a passage through which a reciprocating valve stem extends, an axially inner portion adapted to be secured to the bonnet and an axially outer portion provided with means to receive the temporary handwheel operator;
    (2) an auxiliary stem having an axially inner end attached to the valve stem and an axially outer end provided with external threads;
    (3) a collar having an axially inner end attached to the axially outer portion of the adapter, the collar having an axially inner end overlying the end of the bonnet, the remainder of the collar surrounding the protruding end of the valve stem and the axially inner end of the auxiliary stem,
        (a) the axially inner end of the collar provided with means securing it in a positive manner to the bonnet,
        (b) said collar provided with an axially extending slot in which is positioned a member attached to the inner end of the auxiliary stem thereby making the auxiliary stem nonrotative whereby movement of said auxiliary stem is reciprocatory;
    (4) a rotatable bushing having internal threads which are threadedly engaged with the threads of the auxiliary stem, and having a shoulder around its outer periphery, said bushing having an axially outer end portion provided with means adapted to receive the hub portion of a handwheel;
    (5) a pair of bearings, one positioned on each side of the shoulder of the bushing;
    (6) a cap having a central passage to permit the assembly of the bushing and secured to the axial outer end of the collar;
    (7) a handwheel positioned on the outer end of the bushing;
    (8) means securing the handwheel to the bushing.

4. A temporary handwheel operator for a rising stem gate valve having a reciprocating valve member to which is attached a reciprocating valve stem extending through a passage in a bonnet attached to the valve body, said operator comprising:
- (1) an adapter having a passage through which a reciprocating valve stem extends, an axially inner portion adapted to be secured to the bonnet and an axially outer portion provided with external threads;
- (2) an auxiliary stem having an axially inner end attached to the valve stem and an axially outer end provided with external threads;
- (3) a collar having a threaded portion adjacent the axially inner end attached to the external threads of the adapter, the collar having an axially inner end overlying the end of the bonnet and secured thereto, the remainder of the collar surrounding the protruding end of the valve stem and the axially inner end of the auxiliary stem,
    - (a) said collar provided with an axially extending slot in which is positioned a member attached to the inner end of the auxiliary stem thereby making the auxiliary stem nonrotative whereby movement of said auxiliary stem is reciprocatory;
- (4) a rotatable bushing having internal threads which are threadedly engaged with the threads of the auxiliary stem, and having a shoulder around its outer periphery, said bushing having an axially outer end portion provided with means adapted to receive a handwheel;
- (5) a cap having a central passage to permit the assembly of the bushing and secured to the axial outer end of the collar;
- (6) a handwheel positioned on the outer end of the bushing.

5. A temporary handwheel operator for a rising stem gate valve having a reciprocating valve member to which is attached a reciprocating valve stem extending through a passage in a bonnet attached to the valve body, said operator comprising:
- (1) an adapter having a passage through which a reciprocating valve stem extends, an axially inner portion adapted to be secured to the bonnet and an axially outer portion provided with external threads;
- (2) a non-rotating auxiliary stem having an axially inner end attached to the valve stem and an axially outer end provided with external threads;
- (3) a collar having a threaded portion adjacent its axial inner end attached to the external threads of the adapter, the collar having an axially inner end overlying the end of the bonnet and secured thereto, the remainder of the collar surrounding the protruding end of the valve stem and the axially inner end of the auxiliary stem;
- (4) a rotatable bushing having internal threads which are threadedly engaged with the threads of the auxiliary stem, and having a shoulder around its outer periphery, said bushing having an axially outer end portion provided with means adapted to receive a handwheel;
- (5) a cap having a central passage to permit the assembly of the bushing and secured to the axial outer end of the collar;
- (6) a handwheel positioned on the outer end of the bushing.

6. A temporary handwheel operator for a rising stem gate valve to permit expeditious installation of a high-low pilot control valve on the gate valve, said valve having a reciprocating valve member, a reciprocating stem passing through a passage in a bonnet attached to the valve body, said operator comprising:
- (1) adapter means attached to a bonnet of the valve and having provisions for having an external operator attached thereto;
- (2) an auxiliary stem connected to a stem extending from the valve and having its axially outer end provided with external threads;
- (3) a collar attached to the adapter, having an axial inner end overlying the end of the bonnet and the remainder of the collar surrounding the protruding portion of the valve stem and the axially inner end of the auxiliary stem,
    - (a) means co-operating with the collar and bonnet to hold the collar non-rotative,
    - (b) means co-operating with the auxiliary stem and collar to retain the auxiliary stem non-rotative;
- (4) a rotatable bushing having internal threads which are threadedly engaged with the external threads of the auxiliary stem and having a shoulder around its outer periphery;
- (5) two bearings, one positioned on each side of the shoulder of the bushing;
- (6) a cap having a central passage for the bushing covering the axially outer bearing and being nonrotatively attached to the axial outer end of the collar;
- (7) a handwheel attached to the extending portion of the bushing.

7. A temporary handwheel operator for a rising stem gate valve to permit expeditious installation of a high-low control valve on the gate valve, said valve having a reciprocating valve member, a reciprocating stem passing through a passage in a bonnet attached to the valve body, said operator comprising:
- (1) adapter means attached to a bonnet of the valve and having provisions for having an external operator attached thereto;
- (2) an auxiliary stem connected to a stem extending from the valve and having its axially outer end provided with external threads;
- (3) a collar attached to the adapter having an axial inner end overlying the end of the bonnet and nonrotatively secured thereto, and the remainder of the collar surrounding the protruding portion of the valve stem and the axially inner end of the auxiliary stem;
    - (a) means co-operating with the auxiliary stem and collar to retain the auxiliary stem non-rotative;
- (4) a rotatable bushing having internal threads which are threadedly engaged with the external threads of the auxiliary stem and having a shoulder around its outer periphery;
- (5) a cap having a central passage for the bushing covering the shoulder of the bushing and being nonrotatively attached to the axial outer end of the collar;
- (6) a handwheel attached to the extending portion of the bushing.

8. A temporary handwheel operator for a rising stem gate valve to permit expeditious installation of a high-low control valve on the gate valve, said valve having a reciprocating valve member, a reciprocating stem passing through a passage in a bonnet attached to the valve body, said operator comprising:
- (1) adapter means attached to a bonnet of the valve and having provisions for having an external operator attached thereto;
- (2) a non-rotating auxiliary stem connected to a stem extending from the valve and having its axially outer end provided with external threads;
- (3) a collar attached to the adapter surrounding the protruding portion of the valve stem and the axially inner end of the auxiliary stem,
    - (a) means co-operating with the auxiliary stem and collar to retain the auxiliary stem non-rotative;
- (4) a rotatable bushing having internal threads which are threadedly engaged with the external threads of the auxiliary stem and having a shoulder around its outer periphery;

(5) a cap having a central passage for the bushing covering the shoulder of the bushing and being non-rotatively attached to the axial outer end of the collar;

(6) a handwheel attached to the extending portion of the bushing.

References Cited in the file of this patent

UNITED STATES PATENTS

| | | |
|---|---|---|
| Re. 20,101 | Laurent | Sept. 8, 1936 |
| 2,564,226 | Norway | Aug. 14, 1951 |
| 2,566,774 | Otis | Sept. 4, 1951 |
| 2,582,996 | Laurent | Jan. 22, 1952 |
| 2,859,639 | Bryant | Nov. 11, 1958 |
| 2,942,495 | Milleville | June 28, 1960 |
| 2,953,344 | Yancey | Sept. 20, 1960 |